United States Patent [19]

Underwood et al.

[11] Patent Number: 5,423,712
[45] Date of Patent: Jun. 13, 1995

[54] CUTTER FOR CLIP-ON SUNGLASSES

[76] Inventors: Ronald L. Underwood, 4245 De Feyter Ave., Holland, Mich. 49424; Alan W. Brown, 13594 104th, Grand Haven, Mich. 49417

[21] Appl. No.: 105,339

[22] Filed: Aug. 11, 1993

[51] Int. Cl.6 .............................................. B24B 49/00
[52] U.S. Cl. .................................. 451/8; 451/9; 451/10; 451/237; 451/240; 451/43
[58] Field of Search ............... 451/1, 5, 6, 8, 9, 10, 451/28, 41, 42, 43, 237, 239, 240, 231, 233

[56] References Cited

U.S. PATENT DOCUMENTS

| | | | |
|---|---|---|---|
| 2,005,696 | 6/1935 | Gorton, 3D et al. | 409/109 |
| 3,065,554 | 11/1962 | Colabella, Jr. | 409/130 |
| 3,555,739 | 1/1971 | Novak | 51/101 LG |
| 3,672,855 | 6/1972 | Bright | 51/101 LG |
| 3,786,600 | 1/1974 | Bloxsom | 51/101 LG |
| 4,394,099 | 7/1983 | Santinelli | 51/101 LG |
| 4,596,091 | 6/1986 | Daboudet et al. | 51/101 LG |
| 4,655,005 | 4/1987 | Roberts | 51/273 |
| 4,794,736 | 1/1989 | Fuwa et al. | 51/165.72 |

Primary Examiner—Maurina T. Rachuba
Attorney, Agent, or Firm—Price, Heneveld, Cooper, DeWitt & Litton

[57] ABSTRACT

An apparatus for custom cutting clip-on sunglasses includes a first holder for securely holding eyeglasses and a second holder for securely holding clip-on sunglasses. A first locator assists in positioning the eyeglasses on the first holder. A second locator is used for positioning the sunglasses on the second holder. A support carries a guide for tracing the perimeter of the eyeglasses and a cutter for cutting the clip-on sunglasses. To custom cut the clip-on sunglasses, the eyeglasses are positioned on the holder and each lens of the eyeglasses is marked at a point aligned with a respective locator on the holder. The clip-on sunglasses are then clipped onto the eyeglasses, and the points on the sunglasses positioned over the marks on the eyeglasses are marked. The clip-on sunglasses are then positioned on a second holder. The guide is then moved around the perimeter of the eyeglasses. The cutter moves with the guide such that the cutter cuts the sunglasses into the shape of the eyeglasses.

21 Claims, 7 Drawing Sheets

CUTTER FOR CLIP-ON SUNGLASSES

BACKGROUND OF THE INVENTION

The invention pertains to a cutter for clip-on sunglasses, and more particularly to an apparatus for custom cutting clip-on sunglasses to the shape of eyeglasses.

People enjoy wearing sunglasses to improve their vision and comfort on sunny days as sunglasses reduce glare and shade the eyes. A variety of low cost sunglasses are readily available for people who do not require corrective lenses. However, for people with poor vision who require corrective eyeglasses, sunglasses are expensive. Prescription eyeglasses with corrective lenses are expensive, and the cost of coating the sunglasses significantly increases the price of the eyeglasses. Additionally, new sunglasses must be purchased each time the wearer's vision changes. For people who change prescriptions often, the cost of purchasing sunglasses each time new eyeglasses are required is prohibitive. Accordingly, wearers of prescription eyeglasses may use old sunglasses which do not provide adequate vision correction, or they may go without sunglasses.

Clip-on sunglasses are a low-cost alternative to prescription sunglasses. Clip-on sunglasses clip over conventional prescription glasses to convert these eyeglasses into sunglasses. Although they provide a cost effective solution to the problem of providing sunglasses for people who require corrective vision, clip-on sunglasses are unattractive since they are manufactured in a limited number of shapes and sizes and do not conform to the shape of the eyeglasses. Because people are very conscious of their appearance, opticians cut clip-on sunglasses to the shape of eyeglasses using scissors in an attempt to provide more attractive clip-on sunglasses. Not only is this time consuming to the optician, errors are made during cutting of the sunglasses which necessitates throwing away some clip-on sunglasses and starting again on a new pair of sunglasses. As a consequence, opticians typically do not make a profit on these clip-on sunglasses, and may in fact lose money selling custom fit sunglasses. Additionally, the sunglasses will have rough edges which are unattractive. Because people are concerned about their appearance, they typically will not wear these clip-on sunglasses.

SUMMARY OF THE INVENTION

The present invention provides an apparatus and method for reliably producing custom fit clip-on sunglasses which conform to the shape of any pair of prescription eyeglasses, and are attractive in appearance. The apparatus is easy to use and the method may be carried out by anyone to effectively create sunglasses having the same shape as any pair of prescription eyeglasses.

According to one aspect of the invention, an apparatus for custom cutting clip-on sunglasses comprises a first holder for securely holding eyeglasses to be traced. A second holder securely holds clip-on sunglasses in predetermined spaced relation to the first holder while they are cut. A guide for tracing the perimeter of the eyeglasses is coupled to a connector. A cutter for cutting the clip-on sunglasses is also coupled to the connector such that the guide and cutter are in a predetermined spaced relationship. The guide and the cutter move together such that the clip-on sunglasses are cut by the cutter to the shape of the eyeglasses as the guide traces the eyeglasses.

The apparatus is easy to use consistently, and without error, by anyone, to provide sunglasses custom cut to the shape of a pair of eyeglasses. Because the eyeglasses may be used without error, the optician will not destroy sunglasses while attempting to cut them to the shape of the eyeglasses. The apparatus is relatively inexpensive to manufacture, such that it may be purchased by an optician and used to make custom sunglasses without significantly affecting the cost of each custom cut clip-on sunglasses. Accordingly, attractive, low cost sunglasses may be provided for wearers of prescription eyeglasses.

These and other aspects, features, and advantages of the invention will be further understood and appreciated by those skilled in the art by reference to the following written specification, claims and appended drawings.

BRIEF DESCRIPTION OF THE INVENTION

DETAILED DESCRIPTION OF THE PREFERRED EMBODIMENT

Figure 1:
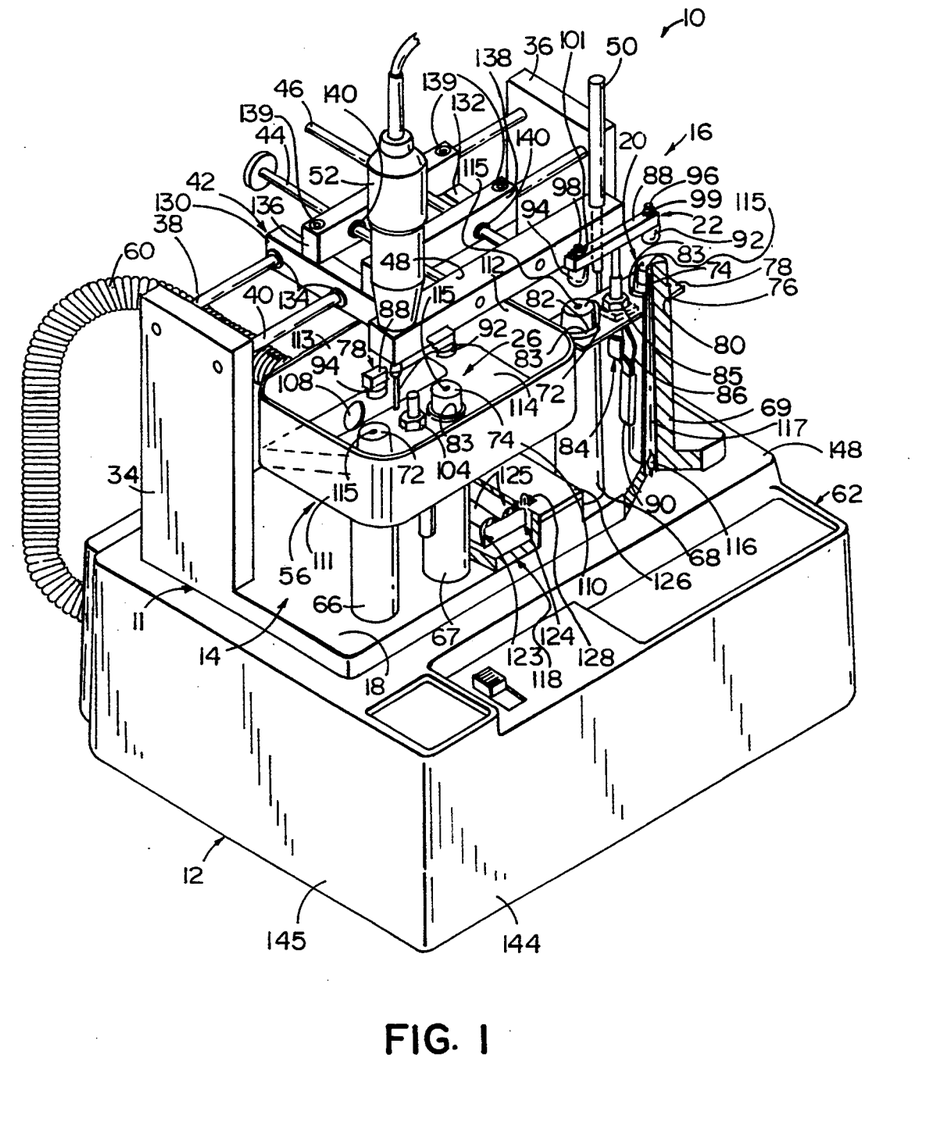
FIG. 1 is a perspective view of a cutter for clip-on sunglasses according to the invention.
Figure 5:
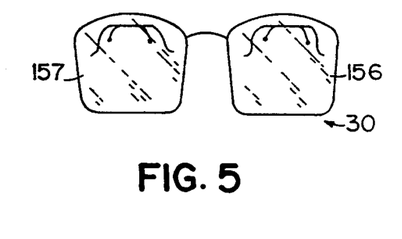
FIG. 5 is a front elevational view of a clip-on sunglasses blank for use with the cutter according to FIG. 1.

A cutter for clip-on sunglasses according to a preferred embodiment of the invention is illustrated in FIG. 1. The cutting apparatus 10 for clip-on sunglasses includes a housing 11 having a base 12, a body 14 supported on base 12, and a cutting mechanism 16 supported on body 14. Body 14 includes a foot 18 attached to the top of base 12. An eyeglass holder 20 projects upwardly from foot 18 and includes a clamp assembly 22 for retaining eyeglasses 24 (FIG. 6) during tracing, as described in greater detail hereinbelow. A holder 26 (FIG. 1) for sunglasses 30 (FIGS. 5, 7 and 8) projects upwardly from foot 18. Holder 26 is spaced a predetermined distance from eyeglasses holder 20 and includes a clamp assembly 28 for retaining clip-on sunglasses 30 (FIG. 5) during cutting. Body 14 thus positions the eyeglasses 24 and sunglasses 30 in a predetermined spaced relationship. A pair of arms 34 and 36 extend upwardly from foot 18 for supporting tracks, or slide shafts, 38 and 40. Tracks 38 and 40 extend the full length between arms 34 and 36, and provide a rail upon which the cutting mechanism travels laterally.

Cutting mechanism 16 includes a platform which travels on tracks 38 and 40. A pair of tracks, or slide shafts, 44 and 46, extend through platform 42. A shoulder 48 is attached to one end of tracks 44 and 46 such that movement of shoulder 48 forward and backward moves tracks 44 and 46 in the platform. A guide, or stylus, 50 is supported on one end of shoulder 48 and a cutter 52 is supported on the other end of shoulder 48. Shoulder 48 travels in a horizontal plane on tracks 38, 40, 44, and 46 to allow guide 50 to trace eyeglasses 24, and cutter 52 moves with stylus 50 to cut sunglasses 30, as described in greater detail hereinbelow.

Figure 3:
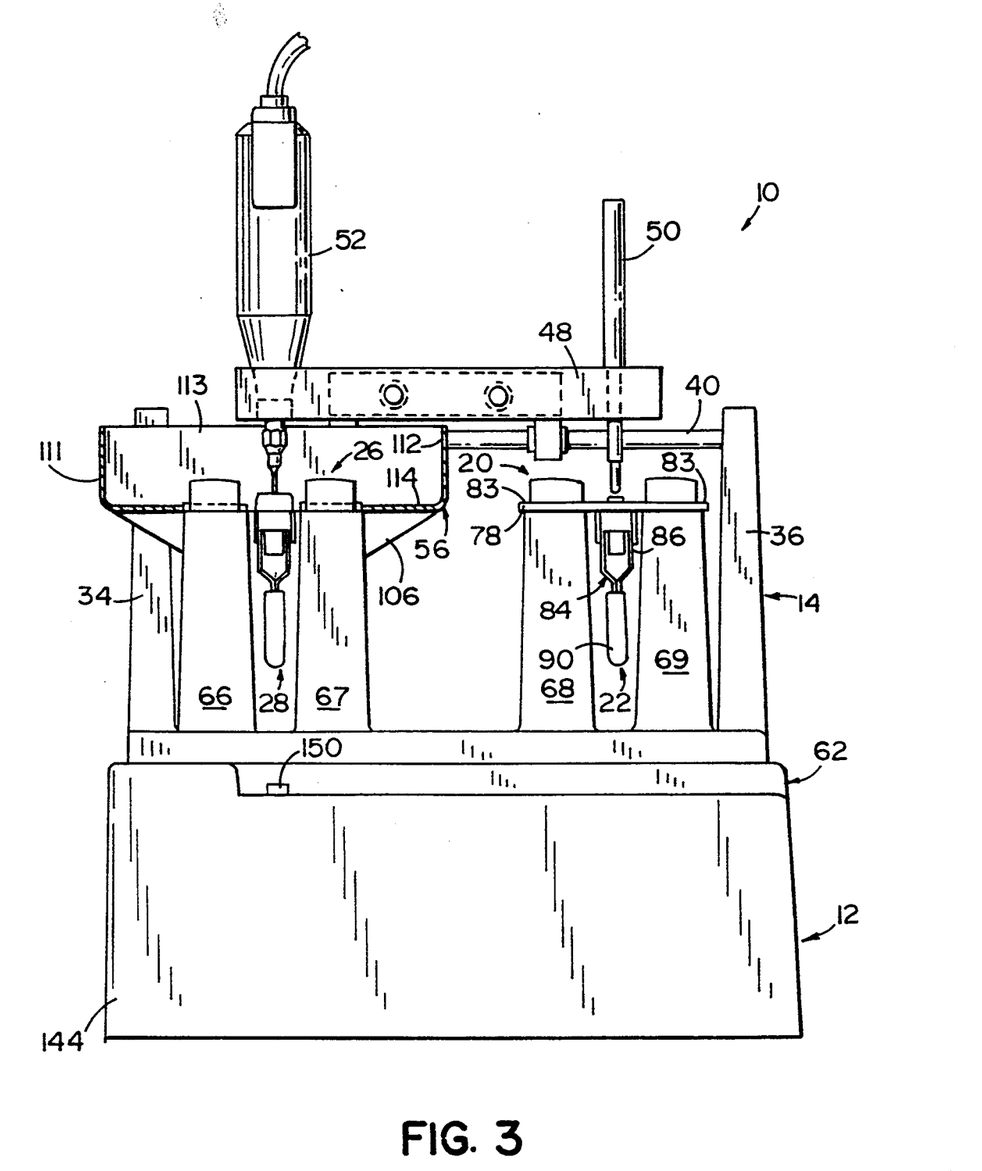
FIG. 3 is a partial sectional front elevational view taken along plane III—III in FIG. 2.
Figure 7:
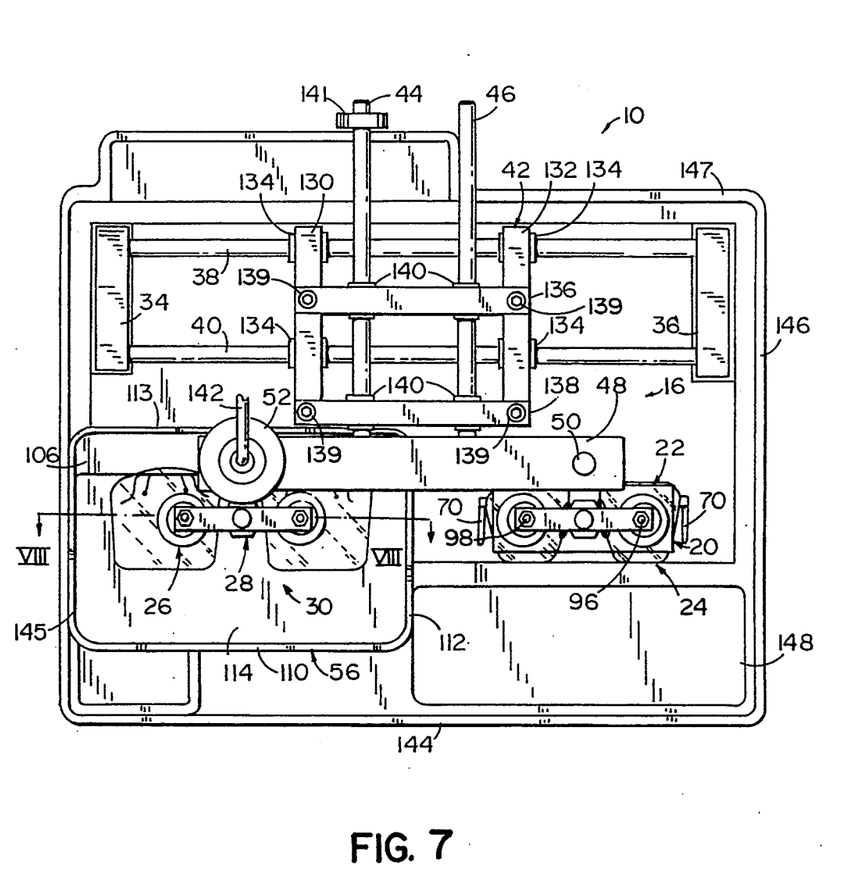
FIG. 7 is a top plan view similar to FIG. 4 with eyeglasses and sunglasses clasped in the holders of the cutter according to FIG. 1.

Holder 26 (FIG. 1) for sunglasses includes a receptacle 56 for catching cuttings and shavings from sunglasses 30 (FIG. 7). A vacuum 58 (FIG. 3) is supported within base 12 and coupled to receptacle 56 through a hose 60. Vacuum 58 collects the cuttings and shavings caught in receptacle 56. The vacuum is enclosed in a generally rectangular housing 62 which helps to dampen the noise from the vacuum.

Somewhat more particularly, and with reference to FIG. 1, the body 14 includes foot 18, arms 34 and 36, and vertical, cylindrical columns 66–69 which are preferably integrally formed, and have a diameter which continuously, gradually decreases from the bottom to the top of the column. The body may be of any suitable, conventional integral construction such as an integrally formed sand cast aluminum or an integrally molded organic polymer. The body may alternately comprise separately formed components which are assembled by conventional means, such as welding or use of fasteners. Integrally formed body 14 is preferred since it is strong, and it is less costly to manufacture because it does not require assembly.

With continued reference to FIG. 1, cylindrical columns 68 and 69 extend substantially orthogonally from foot 18 and provide a base for the eyeglasses holder. Additionally, the columns are sufficiently long that the ear piece 70 (FIG. 8) for the eyeglasses can hang down freely when lenses 152, 154 (FIG. 6) are positioned on lens contact surfaces 72 (FIG. 1) and 74. Each of the columns includes a ledge 76. A clamp mounting plate 78 includes apertures 80 and 82 which receive columns 68 and 69 when the clamp mounting plate is attached to the columns. The clamp mounting plate is manufactured of a suitable rigid material such as aluminum bar stock. Plate 78 rests on ledges 76 when the plate is fully, and properly, installed. Plate 78 is preferably fixedly attached to columns 68 and 69 using solder, an adhesive, threaded fasteners (not shown), a compressive retainer 83, or the like.

Figure 8:
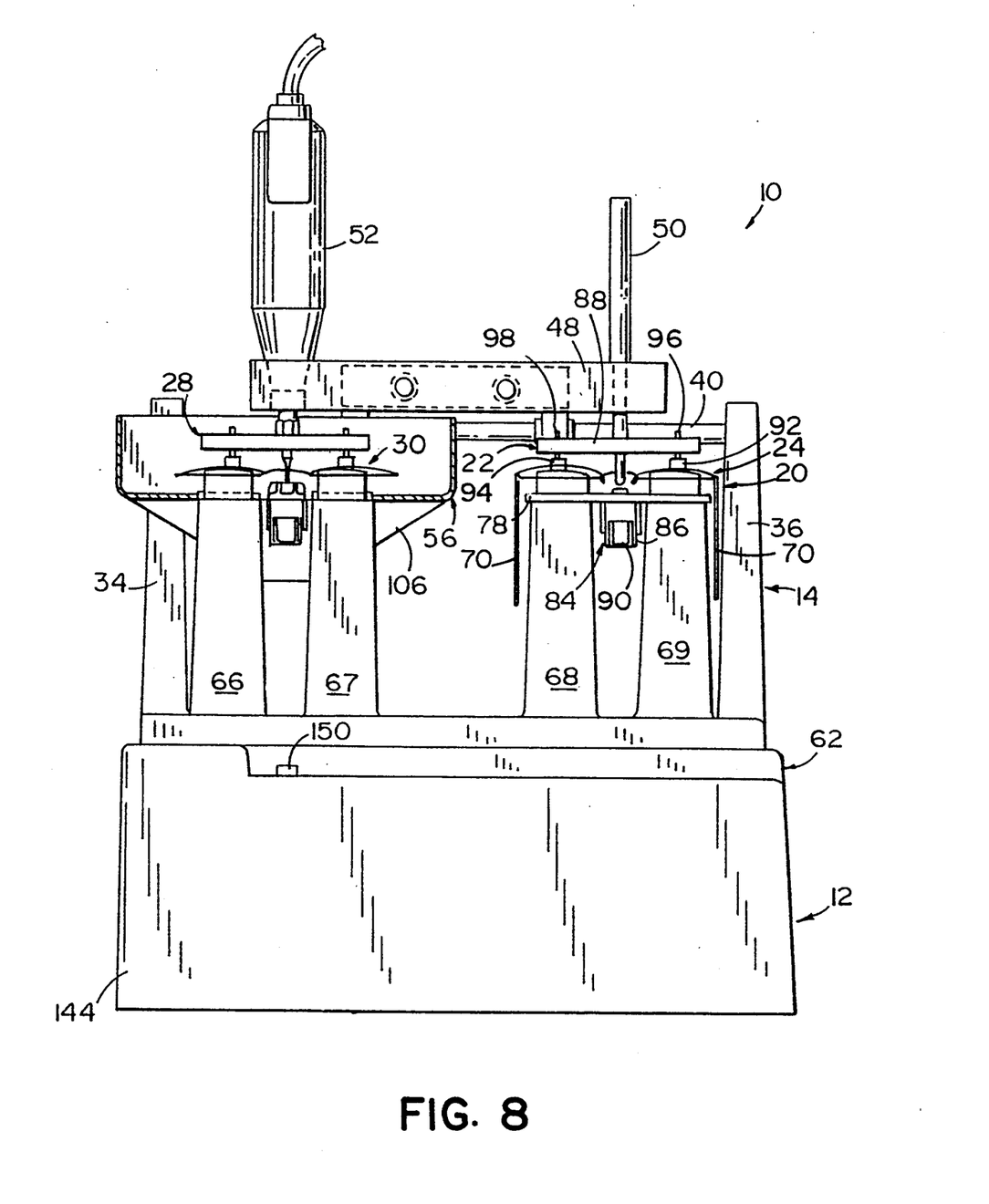
FIG. 8 is a front elevational view with a portion of the cutter cut away along plane VIII—VIII in FIG. 7 and including eyeglasses and sunglasses clasped in the holders of the cutter according to FIG. 1.

A clamp assembly 22 is mounted on clamp mounting plate 78 to hold fast the eyeglasses in holder 20. The clamp assembly includes a clamp 86. A commercially available TC-602 push-pull clamp available from DeSTACO Inc. is preferably used, as it effects a secure clamping action and is easily operated. The clamp is secured to plate 78 by a hex nut 85. Clamp 86 is attached to a clamp bar 88 such that operation of a handle 90 moves clamp bar 88 toward and away from surfaces 72 and 74. The clamp bar includes rubber caps 92 (FIG. 3A) and 94 on opposite ends of clamp bar 88. Rubber caps 92 and 94 are supported on spindles 96 and 98. The spindles 96 and 98 are attached to bar 88 using hex nuts 99 and 101, pins, or the like. The rubber caps project downwardly to contact eyeglasses resting on surfaces 72 and 74 when clamp assembly 22 is closed, as shown in FIG. 8. Spindles 96 and 98 may be provided by any commercially available spindle, and are preferably TC-205203 spindle assemblies available from DeSTACO Inc. Rubber caps 92 and 94 may be any commercially available caps, and are preferably TC-215119 rubber caps available from DeSTACO Inc.

Figures 3A, 3C:
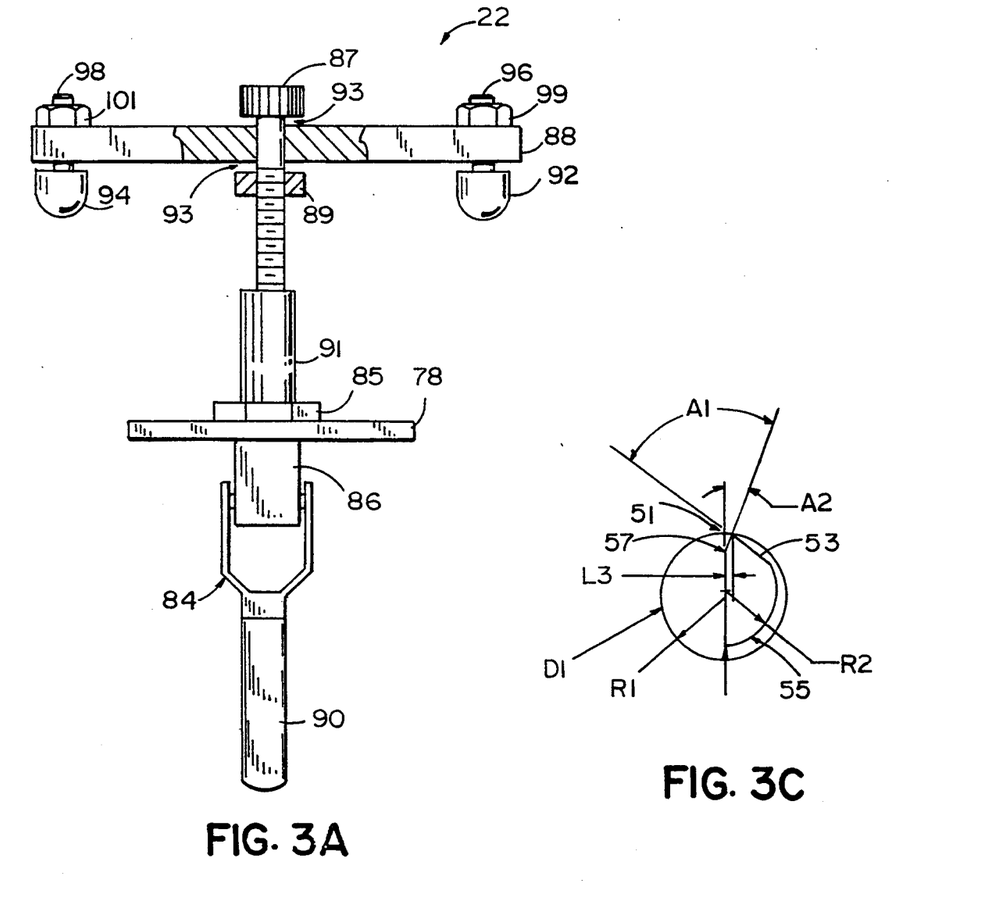
FIG. 3A is an exploded front elevational view, partially broken away, of the clamp assembly in FIG. 3.
FIG. 3C is an end view of the carbide routing cutter according to FIG. 3B.
Figure 6:
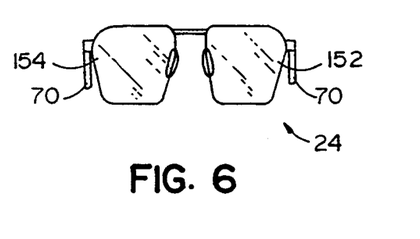
FIG. 6 is a front elevational view of eyeglasses for tracing on the cutter according to FIG. 1.

More particularly, and with reference to FIG. 3A, the clamp bar 88 is carried between the head of a $\frac{1}{4}-20\times1.75$ S.H.C.S. bolt 87 and a $\frac{1}{4}\times20$ hex nut 89. The bolt is screwed into spindle 91 of clamp 86, which spindle is internally threaded. A gap 93 exists between the head of bolt 87 and nut 89. Bolt 87 is rotated clockwise and counterclockwise to adjust the distance between nut 89 and the end of spindle 91, which is fixed on plate 78. This rotation of bolt 87 thus also effects a change in the distance between pads 92, 94 and surfaces 72 (FIG. 1), 74. Accordingly, the clamping pressure may be adjusted using bolt 87 to adjust for different thicknesses of lenses 152, 154 (FIG. 6).

Holder 26 (FIG. 1) for sunglasses 30 (FIG. 5) includes columns 66 (FIG. 1), 67, receptacle 56, and clamp assembly 28. Cylindrical columns 66, 67 and clamp assembly 28 are identical to columns 68 and 69 and clamp assembly 22. Thus, columns 68 and 69 include a ledge 76. Receptacle 56 includes two apertures 104 and 106 which receive columns 66 and 67. Receptacle 56 rests on ledges 76 of columns 68 and 69 when the receptacle is fully installed on the columns. Receptacle 56 is preferably fixedly attached to columns 68 and 69 using solder, an adhesive, threaded fasteners, a compressive retainer, or the like. Clamp assembly 28 is attached to receptacle 56 using a hex nut 104.

As mentioned above, receptacle 56 (FIG. 1) catches cuttings and shavings which cutter 52 removes from the sunglasses blank. The receptacle is generally rectangular, including a front wall 110, sidewalls 111, 112, a back wall 113, and a bottom 114. To improve the suction within the receptacle, a downwardly extending V-shaped funnel 106 is provided at the back of the receptacle and an aperture 108 extends through the back wall 110 at the bottom of the funnel. The funnel creates additional suction within receptacle 56 by which the cuttings are drawn into the vacuum. Aperture 108 may extend through the lowest point of the funnel such that hose 60 would extend vertically at the connection point. Hose 60 is attached to the back wall at aperture 108. A flange may be provided around the aperture for receipt inside hose 60. The hose may be attached to receptacle 56 at the flange using an adhesive, a clamp (not shown) compressed over the hose, or the like. The receptacle may be of any suitable construction using a metal or an organic polymer, and is preferably vacuum formed ABS.

Each of columns 66–69 (FIG. 1) includes a respective locator 115 centrally positioned on the top surface 72, 74 to assist in positioning the eyeglasses and sunglasses in holders 20, 26, as described in greater detail hereinbelow. The locator may be printed on top surface 72, 74 of each column. Preferably, each locator provides an "X" shaped alignment target in a respective surface 72, 74. The locator for each of columns 66–69 may be provided by a lamp 116 mounted at the bottom of the columns (only the locator for column 69 is described herein for brevity, since all the locators are identical thereto). A light guide 117 extends between lamp 116 and a central opening in surface 74. The opening may be sealed with a transparent cover (not shown) to prevent debris from falling into the light guide, which debris might otherwise block the light guide. Lamp 116 may be a 272-1098 min. lamp available from ARCHER Inc. Light guide 117 may be a central tube integrally formed with the column.

A battery housing 118 (FIG. 1) is provided in foot 18. The battery housing includes four, rectangular walls (not shown) which extend upwardly from the horizontal base of foot 18. The walls are preferably integrally formed with the horizontal base of foot 18. A battery holder 123 is mounted to foot 18 within the walls of battery housing 118 using threaded fasteners (not shown), an adhesive, or the like. The battery holder may be provided by any suitable device, such as the 270-391 battery holder available from ARCHER Inc. Four 1.5 Volt, AA batteries are used as a power source for the lamps 116. The power source is connected to one terminal (not shown) of a switch 124 through a wire (not shown). Another terminal (not shown) of switch 124 is connected to each of lamps 116 through respective wires (not shown). When switch 124 is closed, power is supplied to respective lamps 116 associated with each of columns 66-69. When switch 124 is open, respective lamps 116 are all disconnected from the power source, and the lamps are off. The switch may be provided by a commercially available slide switch available from ARCHER Inc. The battery housing is closed by a cover 126. Cover 126 includes an opening 128 through which switch 124 extends. The cover may be formed from the same material as body 14, and thus may be ABS sheet stock or aluminum.

Sliding shafts 38 (FIG. 2) and 40 extend substantially in parallel between arm 34 and arm 36, and provide tracks upon which platform 42 travels laterally. Shafts 38 and 40 may be mounted on arms 34, 36 by any conventional means, such as using threaded fasteners (e.g., nuts, not shown, attached to threaded ends of the bar and shaft), pins (not shown) extending through each of the shafts to lock the shafts against movement, welding, an adhesive, or the like. The shafts are of any suitable construction, such as those available from Thompson Industries.

Figure 2:
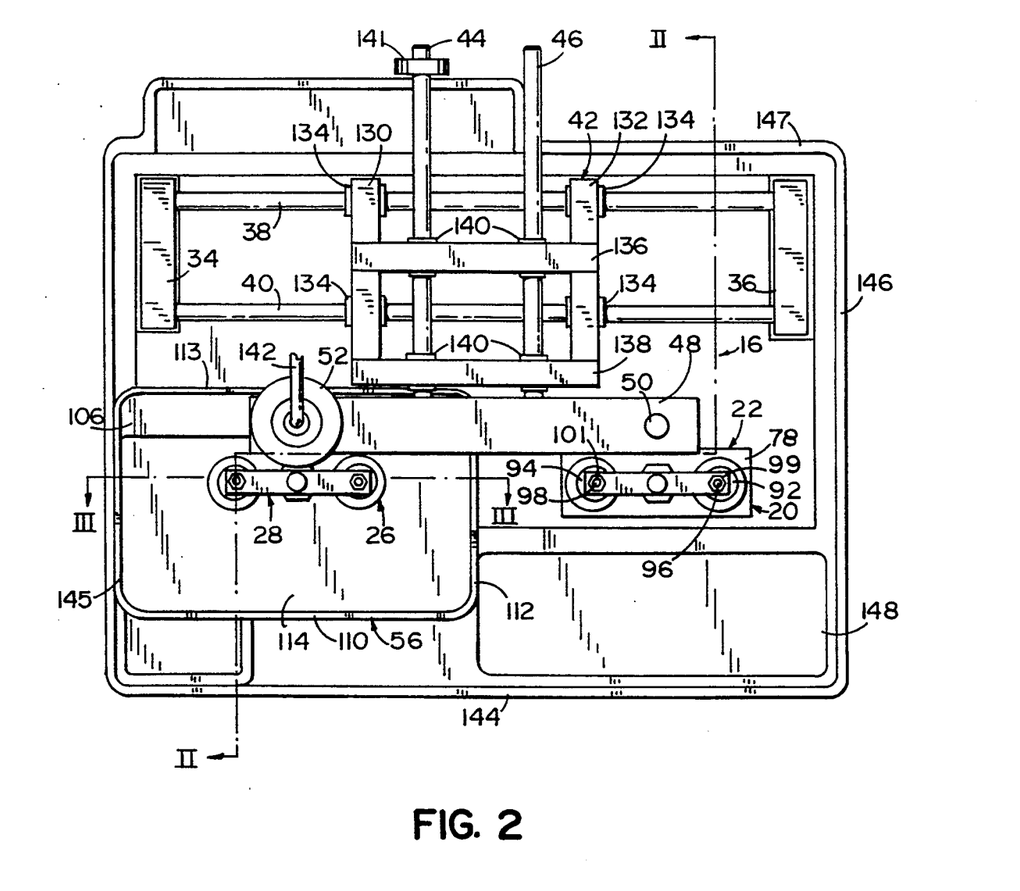
FIG. 2 is a top plan view of the cutter according to FIG. 1.

A platform 42 (FIG. 2) travels on shafts 38 and 40. The platform includes two mounting bars 130 and 132 having a longitudinal axis perpendicular to the longitudinal axes of slide shafts 38 and 40, as best shown in FIG. 2. Bearings 134 are mounted between mounting bars 130, 132 and each of the slide shafts 38, 40 such that the mounting bars travel easily, without jerking caused by variations in the friction between the mounting bars and the sliding shafts. Two mounting bars 136 and 138 are attached to mounting bars 130 and 132 using suitable conventional means, such as threaded fasteners 139 (which may be 32×1.25 S.H.C.S. screws, ten of which may be used to fully assemble the platform), an adhesive, or the like. Mounting bars 136 and 138 are arranged orthogonally to mounting bars 130 and 132. Bearings 140 are mounted between mounting bars 136 and 138 and slide shafts 44 and 46. Bearings 134 and 140 may be SUPER-6 BALL BUSHINGS commercially available from Thompson Industries.

Slide shafts 44 and 46 provide a track which moves through mounting bars 136 and 138. Shoulder 48 is fixedly attached to one end of shafts 44 and 46 by conventional means, such as welding, threaded fasteners (not shown), pins (not shown), press-fit, or the like. A CTC lock collar 141 is attached to the other end of slide shaft 44 to prevent the slide shafts 44 and 46 from sliding out of mounting bars 136 and 138. The lock collar may be a 10 and ⅜ commercially available lock collar. Shoulder 48 is manufactured from any suitable material, and may be provided by aluminum bar stock.

A guide, or stylus, 50 (FIG. 1) and a cutter 52, are mounted on shoulder 48. The stylus and cutter are each inserted through respective apertures on opposite ends of the shoulder. Stylus 50 may be secured to the shoulder by welding, use of a fastener, an adhesive, or the like. The stylus may be of any suitable construction, such as cold rolled steel round stock. The cutter is preferably removably secured to the shoulder using a clamp, a retainer ring, or the like. The cutter is provided by a suitable grinder, or drill, and is preferably provided by a Model 275 hand grinder manufactured by DREMEL, and having a carbide routing cutter. The grinder is plugged into an AC wall outlet using a plug (not shown) on the distal end of cord 142.

Figure 3B:
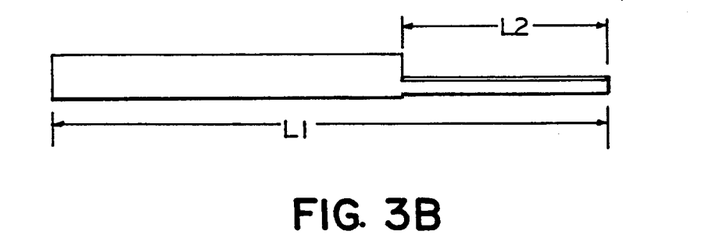
FIG. 3B is an exploded front elevational view of a carbide routing cutter in FIG. 3.

A particularly advantageous carbide routing cutter is disclosed in FIGS. 3B and 3C. The carbide routing cutter includes a cutting edge 51, a primary relief 53, a radial relief 55, and a negative rake 57. The carbide routing cutter may have a length between one-half and two inches, and preferably has a length of approximately one and one-half inches. The radius R1 of the routing cutter is preferably between 0.05 and 0.062 inch, and is most preferably 0.0625 inch. The length L2 of the cutting end is preferably between one-half and three-quarter inch and in a preferred embodiment is approximately 9/16 inch. Angle A1 is between 45 and 75 degrees, and most preferably has an angle of sixty degrees. Angle A2 is between 5 and 30 degrees, and is most preferably 15 degrees. Dimension L3 is between 0.010 and 0.015 inch, and most preferably is 0.013 inch. The radius R2 of the radial relief is between 0.375 and 0.625 inch, and is most preferably 0.05 inch. The axis for radial relief 55 is approximately 0.005 above the longitudinal axis CL of the routing cutter. The negative rake is particularly important for effective trimming of the lenses The carbide routing cutter, according to the most preferred embodiment described herein, provides smooth, sharp edges on the lenses.

Figure 4:
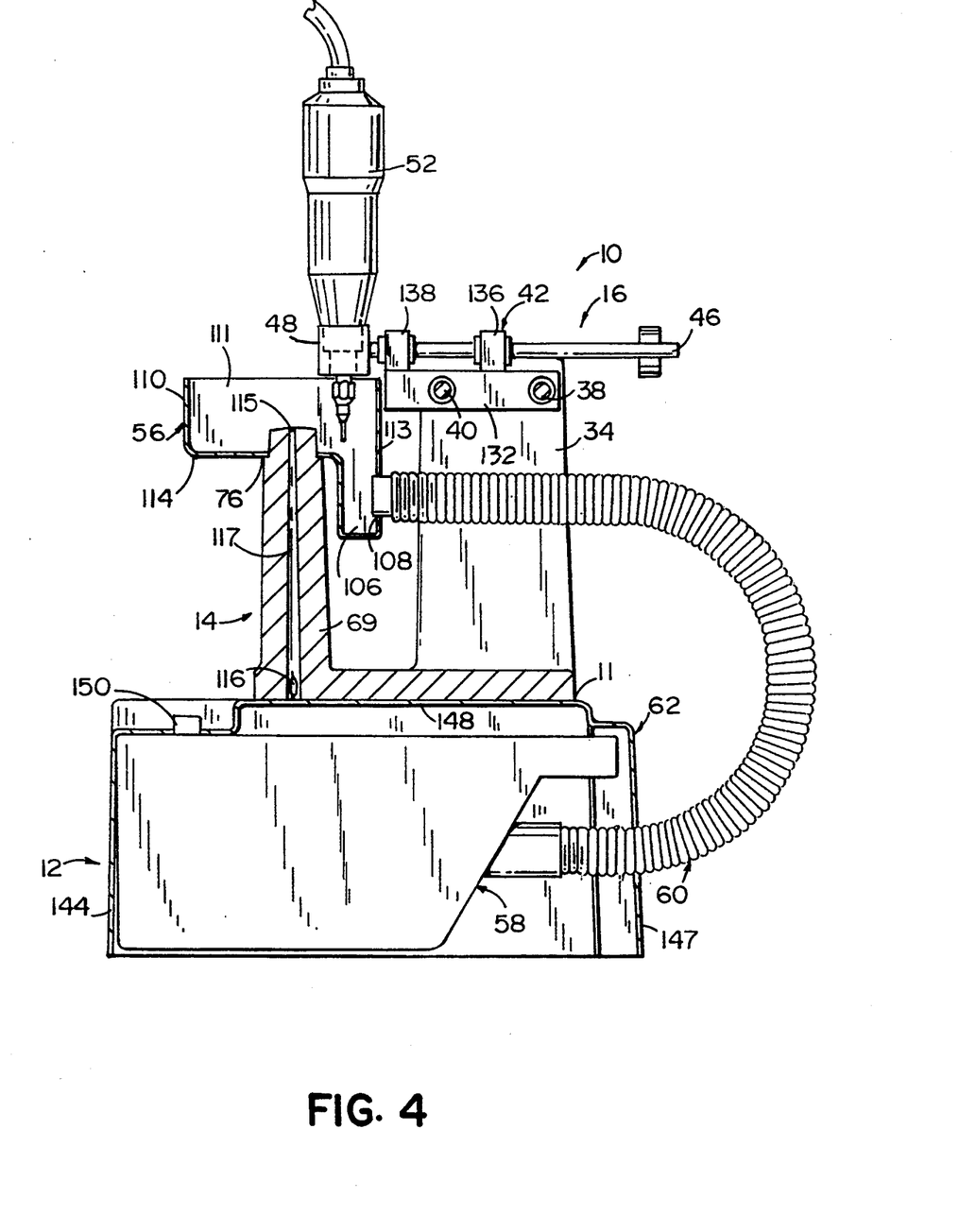
FIG. 4 is a partial cross sectional view of the cutter according to FIG. 1 taken along plane IV—IV in FIG. 2.

Base 12 (FIGS. 1 and 4) is a generally rectangular stand, having four walls 144-147 and a top 148. The stand is of any suitable construction, such as vacuum formed ABS. Vacuum 58 is housed within stand 12. The vacuum may be a 4Z904 portable vacuum available from Dayton Inc. The vacuum is turned on and off using a switch 150. The switch is accessible though an opening in the top 148 of stand 12.

To assemble cutter 10 (FIG. 1) for clip-on sunglasses, body 14 is initially attached to base 12. Base 12 and body 14 may be connected by any suitable means, such as threaded fasteners (not shown), an adhesive, retainer clips, or the like. Vacuum cleaner 58 is assembled into housing 62 such that switch 150 projects through top wall 148. An opening is provided in the back wall 147 of base housing 62 (FIG. 4) for removal of vacuum 58 and passage of hose 60. Vacuum 58 is preferably not secured within housing 62, although the vacuum may be secured to the housing using snap connectors, or other releasable fasteners, such that vacuum 58 may be removed from base housing 62. Vacuum 58 is removably connected to permit changing filters and/or bags in the vacuum. The opening in back wall 147 of housing 62 also facilitates the free flow of air out of vacuum 58 and cooling of the vacuum. The battery holder 123 (FIG. 1) is assembled into battery housing 118 using fasteners, an adhesive, or the like. Switch 124 is then assembled into cover 126 and conductors (not shown) are connected between the batteries 125 and switch 124. Additional wires are connected between switch 124 and the respective lamps 116 associated with each of columns 66–69. Cover 126 is then removably assembled to battery housing 118 using snap connectors, threaded fasteners, or the like. The battery housing cover is removably connected to assist in changing batteries.

Clamp assemblies 22 and 28 are then assembled to clamp mounting plate 78 and receptacle 56, respectively. The clamp assemblies are secured to mounting plate 78 and receptacle 56 by respective hex nuts 85 and 104. The mounting plate 78 is then inserted over columns 68 and 69 such that it comes to rest on ledges 76. Receptacle 56 is likewise assembled over columns 66 and 67 such that it comes to rest on ledges 76. Respective retainer rings 83 are then pressed downwardly onto columns 66–69 to fixedly secure plate 78 and receptacle block 56 onto columns 66–69. Hose 60 is next assembled into aperture 108 and funnel 106.

The cutting mechanism 16 is assembled to body 14 in the following manner. With bushings 134 assembled into bars 130 and 132 by conventional means, such as press fitting or snap ring retaining, the mounting bars are slid onto tracks 38 and 40. Tracks 38 and 40 are attached to arms 34 and 36, such that they extend the full distance therebetween. Mounting bars 136 and 138 are then assembled to mounting bars 130 and 132 using threaded fasteners 139. The interconnected, orthogonally arranged, mounting bars 130, 132, 136 and 138 provide a rigid platform which travels laterally on tracks 38 and 40.

Shoulder 48 is attached to tracks 44 and 46 using conventional means, such as threaded fasteners, a pin, press fit, or the like, such that the shoulder is securely fastened thereon. Tracks 44 and 46 are then inserted through bearings 140, which are mounted within mounting bars 136 and 138 by conventional means such as press fit. A CTC lock collar 44 is then fixedly secured to an end of bar 44 opposite shoulder 48 to prevent tracks 44 and 46 from sliding out of mounting bars 136 and 138. Guide 50 and cutter 52 are then attached to shoulder 48 using any suitable conventional means, such as a retainer, an adhesive, fasteners, or the like.

In operation, lenses 152 (FIG. 6) and 154 of eyeglasses 24 are positioned over surfaces 72 (FIG. 1) and 74 on the ends of columns 68 and 69. The approximate center of lenses 152 and 154 are positioned over locator 115. The operator then marks the eyeglasses at the position of the locator, as illustrated in FIG. 6, using a suitable writing instrument such as a wax pencil. The operator removes the eyeglasses from eyeglass holder 20 and attaches the clip-on sunglasses over the eyeglasses. The operator then marks the position on the sunglass lenses 156 and 157 (FIG. 5) which is aligned with the marks on lenses 152 and 154 (FIG. 6). The eyeglasses are then placed onto surfaces 72 (FIG. 1) and 74 of columns 68 and 69, with the marked positions on the eyeglasses aligned with the locators 115. Clamp assembly 22 is closed, as shown in FIG. 8, to hold the glasses securely in position on the eyeglass holder. Clip-on sunglasses 30 are then positioned onto surfaces 72 and 74 of columns 66 and 67, such that the marked location on each of lenses 156 and 157 is positioned over a respective locator 115. The clamp assembly 28 is then closed onto sunglasses 30 to securely hold the sunglasses in a cutting position, as illustrated in FIG. 8. As illustrated in FIG. 7, with both eyeglasses 24 and sunglasses 30 held in their respective holders, guide 50 and cutter 52 are positioned at the same location relative to the sunglasses and eyeglasses (FIG. 7 shows guide 50 and cutter 52 both positioned at the center of the bridge on each of the eyeglasses and the sunglasses).

With cutter 52 turned on, the operator moves guide 50 around eyeglasses 24 to trace the outline of eyeglasses 24. As guide 50 moves, the cutter will move along the sunglasses, cutting off portions of shades 156 and 157 which extend beyond lenses 152 and 154. After the operator has moved guide 50 such that it has circumscribed the entire perimeter of the eyeglasses, the sunglasses will have been cut to the same shape and dimension as the eyeglasses. Because the bearings are utilized in mounting bars 130, 132, 136 and 138, shoulder 48 moves freely within the horizontal plane extending through the center of shafts 44 and 46 as the guide traces the eyeglasses. This allows the operator to move the guides freely with little resistance from guide rails 38, 40, 44 and 46.

Thus it can be seen that an apparatus is disclosed which may be used to custom cut clip-on sunglasses. The apparatus is easy to use, such that an unskilled operator may cut sunglasses. Opticians may utilize the apparatus to cut sunglasses without error such that they do not waste blanks.

In the forgoing description, it will be readily perceived by those skilled in the art that modifications may be made without departing from the concepts disclosed herein. Such modifications are to be considered included in the following claims, unless the claims by their language expressly state otherwise.

The embodiments of the invention in which an exclusive property or privilege is claimed are defined as follows:

1. An apparatus for custom cutting clip-on sunglasses, comprising:
   a housing;
   a first holder supported on said housing for securely holding a pair of eyeglasses and fixed with respect to said housing;
   a second holder supported on said housing for securely holding a pair of clip-on sunglasses and fixed with respect to said housing;
   at least one first locator associated with said first holder for assisting in positioning the pair of eyeglasses on said first holder;
   at least one second locator associated with said second holder for assisting in positioning the pair of clip-on sunglasses on said second holder;
   a support carried on the housing and movable with respect to said housing;
   a guide member mounted on said support for following the perimeter of the pair of eyeglasses; and
   a cutter mounted on said support, and spaced from said guide member, for cutting the pair of clip-on sunglasses whereby said cutter moves with said guide member to cut the pair of clip-on sunglasses to substantially the same shape as the pair of eyeglasses.

2. The apparatus according to claim 1, further including substantially orthogonal tracks supported on said housing, and wherein said support is carried on said tracks such that it moves freely in a plane.

3. The apparatus as defined in claim 2, wherein said support is attached to at least a first one of said tracks, and said tracks are carried on a platform which moves on at least one second track orthogonal to said at least one first track.

4. The apparatus as defined in claim 3, further including bearings positioned between said first one of said tracks and said platform.

5. The apparatus as defined in claim 4, further including bearings positioned between said platform and said second one of said tracks.

6. The apparatus as defined in claim 1, wherein said first holder includes a surface for supporting each lens of said pair of eyeglasses.

7. The apparatus as defined in claim 6, wherein said first holder includes a clamp for abutting said eyeglasses on a surface opposite said one surface of the eyeglasses.

8. The apparatus as defined in claim 7, wherein said second holder includes a surface for supporting one surface of the sunglasses.

9. The apparatus as defined in claim 8, wherein said second holder includes a clamp for engaging said sunglasses on a surface opposite said one surface of the sunglasses.

10. The apparatus as defined in claim 9, wherein said first and second holders each include respective pads associated with the clamps for engaging the eyeglasses and clip-on sunglasses.

11. The apparatus as defined in claim 1, wherein said first holder includes a surface for supporting one surface of said eyeglasses and said locator is positioned on said surface of said first holder.

12. The apparatus as defined in claim 11, wherein said second holder includes a surface for supporting one surface of said eyeglasses and said locator positioned on said surface of said second holder.

13. The apparatus as defined in claim 12, wherein said locators each include a lamp emitting a beam of visible light when viewing said surfaces of said first and second holders.

14. The apparatus as defined in claim 13, wherein each of said lamps is coupled to a light guide through which light travels to said surfaces of said first and second holders.

15. The apparatus as defined in claim 1, further including a receptacle supported on said housing, said receptacle positioned adjacent said second holder.

16. The apparatus as defined in claim 15, further including a vacuum positioned in said housing and coupled to said receptacle to collect shavings from said receptacle.

17. An apparatus for custom cutting clip-on sunglasses, comprising:
a base;
a first holder defined by upright columns fixed to said base for securely holding a pair of eyeglasses;
a second holder defined by upright columns fixed to said base for securely holding a pair of clip-on sunglasses in predetermined spaced relation to said first holder;
a carriage mounted to said base and movable with respect to said base;
a guide connected to said carriage and adapted to follow the perimeter of the pair of eyeglasses; and
a cutter connected to said carriage in spaced relation to said guide, whereby said guide is moved along the perimeter of the pair of eyeglasses which moves said carriage such that said cutter moves in substantially the same pattern as said guide while said cutter cuts said pair of sunglasses to the shape of said eyeglasses.

18. A method of forming custom clip-on sunglasses for a pair of eyeglasses, comprising the steps of:
positioning the eyeglasses on a first holder;
marking points on the eyeglasses aligned with a locator on the first holder;
clipping the clip-on sunglasses blank onto said eyeglasses and marking the lenses on the clip-on sunglasses at a location aligned with the mark on the eyeglasses;
positioning the clip-on sunglasses on a second holder which is in predetermined spaced relation to the first holder; and
moving a guide around the eyeglasses such that a cutter carried with the guide cuts the sunglasses into the perimeter shape of the eyeglasses.

19. The method as defined in claim 18, wherein said step of positioning said eyeglasses includes aligning a central portion of each lens of the eyeglasses with a respective lamp.

20. The method as defined in claim 19, wherein said step of positioning the clip-on sunglasses includes the step of aligning the mark on the lenses of the sunglasses with respective lamps associated with the first holder.

21. A method of custom forming a pair of clip-on sunglasses to a pair of eyeglasses, comprising the steps of:
positioning the pair of eyeglasses on a first holder;
positioning the pair of clip-on sunglasses on a second holder such that the pair of clip-on sunglasses are held in spaced relation to the pair of eyeglasses;
moving a guide, coupled to a cutter, around the perimeter of the pair of eyeglasses such that the cutter moves in substantially the same pattern as the guide while the cutter cuts the pair of clip-on sunglasses, whereby the clip-on sunglasses are cut to the shape of the pair of eyeglasses.

* * * * *